US011378180B2

United States Patent
Strak et al.

(10) Patent No.: US 11,378,180 B2
(45) Date of Patent: Jul. 5, 2022

(54) TORQUE DETERMINATION IN AUXILIARY CONSUMERS

(71) Applicant: ZF FRIEDRICHSHAFEN AG, Friedrichshafen (DE)

(72) Inventors: Dieter Strak, Immenstaad am Bodensee (DE); Anton Waibel, Friedrichshafen (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 17/054,064

(22) PCT Filed: Apr. 10, 2019

(86) PCT No.: PCT/EP2019/059017
§ 371 (c)(1),
(2) Date: Nov. 9, 2020

(87) PCT Pub. No.: WO2019/214890
PCT Pub. Date: Nov. 14, 2019

(65) Prior Publication Data
US 2021/0277991 A1     Sep. 9, 2021

(30) Foreign Application Priority Data
May 8, 2018   (DE) .......................... 102018207097.0

(51) Int. Cl.
*F16H 59/14*   (2006.01)
*F16H 59/36*   (2006.01)
*F16H 61/00*   (2006.01)

(52) U.S. Cl.
CPC ............. *F16H 59/14* (2013.01); *F16H 59/36* (2013.01); *F16H 2059/145* (2013.01); *F16H 2059/147* (2013.01); *F16H 2059/366* (2013.01); *F16H 2061/0096* (2013.01)

(58) Field of Classification Search
CPC .... F16H 59/14; F16H 59/36; F16H 2059/366; F16H 2061/0096; F16H 2059/147; F16H 2059/145; B60W 2510/1025; B60W 2510/0657; B60W 2510/305
USPC ............................................... 701/58, 62, 63
See application file for complete search history.

(56) References Cited

U.S. PATENT DOCUMENTS

| 5,319,555 A |   | 6/1994 | Iwaki et al. |
| 5,484,351 A | * | 1/1996 | Zhang ................... B60W 30/18 477/110 |
| 5,595,551 A | * | 1/1997 | Hedstrom ......... B60W 30/1819 477/109 |

(Continued)

FOREIGN PATENT DOCUMENTS

| EP | 0683336 A1 | 11/1995 | |
| WO | WO-2008094115 A1 | * 8/2008 | ............ B60W 10/06 |

*Primary Examiner* — Roger L Pang
(74) *Attorney, Agent, or Firm* — Finch & Maloney PLLC; Michael J. Bujold; Jay S. Franklin

(57) ABSTRACT

An arrangement comprising a motor, a transmission, a transmission control unit and an auxillary use. The motor is rotatably connected to the transmission and the auxillary user. The transmission control unit is designed to determine a torque applied to the transmission by using a parameterisable function, wherein the function maps rotational speeds of the motor to a torque applied to the auxillary user at the rotational speed.

11 Claims, 1 Drawing Sheet

(56) References Cited

U.S. PATENT DOCUMENTS

| | | | | |
|---|---|---|---|---|
| 5,778,329 A | * | 7/1998 | Officer | F16H 59/32 |
| | | | | 701/55 |
| 5,952,586 A | * | 9/1999 | Matui | G01L 3/1414 |
| | | | | 73/862.194 |
| 6,022,292 A | * | 2/2000 | Goodnight | F16H 59/14 |
| | | | | 477/115 |
| 6,071,211 A | * | 6/2000 | Liu | B60W 30/1819 |
| | | | | 477/175 |
| 6,379,283 B1 | | 4/2002 | Cullen | |
| 2005/0216165 A1 | * | 9/2005 | Ito | F02D 41/16 |
| | | | | 701/84 |

* cited by examiner

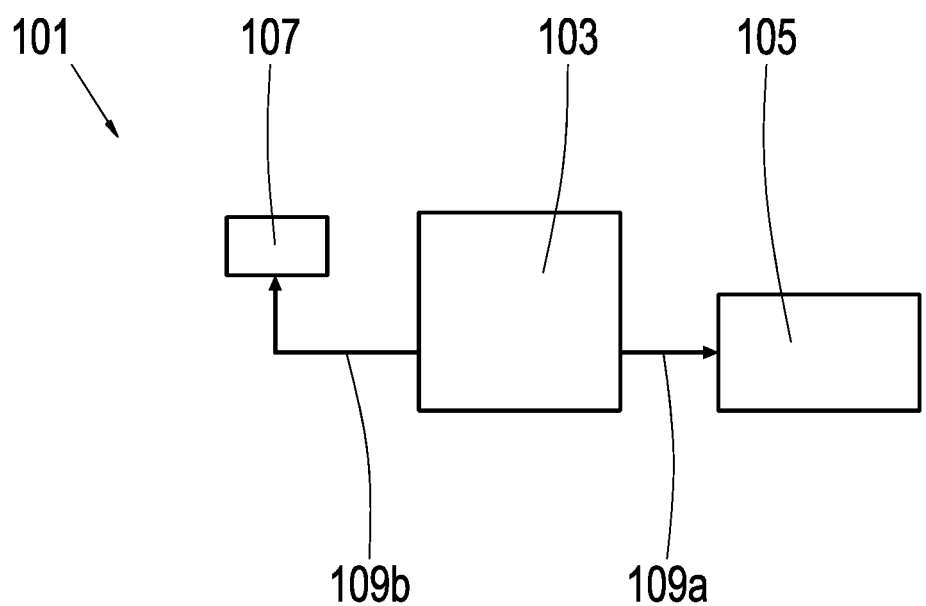

TORQUE DETERMINATION IN AUXILIARY CONSUMERS

CROSS-REFERENCE TO RELATED APPLICATIONS

This application is a national stage of International Application No. PCT/EP2019/059017, filed Apr. 10, 2019, the disclosure of which is incorporated herein by reference in its entirety, and which claimed priority to German Patent Application No. 102018207097.0, filed May 8, 2018, the disclosure of which is incorporated herein by reference in its entirety.

TECHNICAL FIELD

The present disclosure relates to an arrangement a first method and a second method.

In the utility vehicle sector, frameworks for vehicles, comprising an engine, cab, drivetrain and a platform, are sold to specialized vehicle builders, so called body builders. The body builders equip the vehicle framework with its own body. A tow truck or a camper, for instance, can be produced thereby.

The manufacturer of the vehicle framework does not know what the body builder will install in the vehicle. In particular, auxiliary equipment, such as generators, pumps or climate control compressors which are driven by the internal combustion engine of the vehicle, pose problems when they are retrofitted by the body builder.

If an auxiliary consumer is connected, this taps torque from the engine Accordingly, the torque applied to the gearbox of the vehicle is reduced. If this is not taken into account appropriately by the gearbox control unit, incorrect pressures are applied to the clutches. This leads to a loss of comfort due to hard shifting procedures, causes increased wear and can even result in damage to the gearbox.

If information relating to the torque tapped by the auxiliary consumer is available to the gearbox control unit, the clutch pressures can be adapted accordingly. However, for auxiliary consumers which are retrofitted by a body builder, information relating to the tapped torque is usually unavailable.

SUMMARY

The present disclosure is based on the object of improving the shifting quality in vehicles which are built by body builders based on a framework.

This object is achieved by an arrangement, a first method and a second method. Preferred further developments are contained in the sub-claims.

The arrangement comprises an engine, a gearbox, a gearbox control unit and an auxiliary consumer. The arrangement is intended for use in a motor vehicle, in particular a utility vehicle. The engine serves to drive the vehicle. In particular, this can be an internal combustion engine. The gearbox is arranged in a torque flow from an output shaft of the engine to the driven wheels of the vehicle. It therefore transfers and converts an output torque of the engine, with which the vehicle is driven. This is preferably an automatic gearbox, which is controlled by the gearbox control unit. In particular, the gearbox control unit specifies the gear of the gearbox which is engaged in each case and controls the shift elements thereof.

The auxiliary consumer can be, for instance, a generator, a pump or a climate control compressor. The auxiliary consumer is driven by the engine To this end, the engine is rotationally connected to an input or input shaft of the auxiliary consumer. A rotational connection therefore exists between a rotating, driven component of the engine and the input of the auxiliary consumer. In particular, the input of the auxiliary consumer can be rotationally connected to an output shaft or the crankshaft of the engine.

A rotational connection between a first rotatable component and a second rotational component exists when a rotational speed of the first rotatable component and a rotational speed of the second rotatable component are dependent on one another. The rotational-speed association is biunique or reversibly unique. The rotational speed of the second rotatable component therefore depends uniquely on the rotational speed of the first rotatable component. In particular, a linear association can exist between the rotational speed of the first rotatable component and the rotational speed of the second rotatable component. This means that the first rotatable component and the second rotatable component are coupled to a speed increasing or speed reducing transmission or in a rotationally fixed manner.

The input of the auxiliary consumer is preferably coupled to the engine via a belt drive. The belt drive therefore represents the rotational connection between the engine and the input of the auxiliary consumer.

The engine is moreover rotationally connected to an input or an input shaft of the gearbox. In particular, an output shaft or crankshaft of the engine can be connected to the input of the of the gearbox in a rotationally fixed manner.

In a rotationally fixed connection, a rotation of the connected components relative to one another is not possible.

If the auxiliary consumer is active, a proportion of the output power of the engine is diverted and supplied to the auxiliary consumer. The power applied to the input of the gearbox is reduced by the proportion diverted for the auxiliary consumer. The gearbox control unit must take this into account in order to control the gearbox appropriately. In particular, the clutch pressures must be adapted to the power reduced by the auxiliary consumer. To this end, the gearbox control unit is inventively designed to determine a torque applied to the input of the gearbox using a function.

The determination of the torque applied to the applied to input of the gearbox takes place based on an output torque, i.e. a torque applied to the output shaft or crankshaft of the engine. The function serves to identify a value by which the output torque of the engine is reduced by the active auxiliary consumer. To this end, the output torque of the engine is preferably transmitted to the gearbox control unit by an engine control unit. A data transfer device, i.e. a vehicle bus, serves to transmit a corresponding torque signal.

The function used to determine the torque applied to the input of the gearbox is parameterizable. This means that the function maps a function argument depending on one or more parameters to a function value. The mapping via the function therefore varies depending on the parameters.

The parameters can be, for instance, supporting points of the function. The function values located between the supporting points are then calculated by interpolation.

The function argument in the present case is a rotational speed of the engine. This is mapped to the torque applied to the input of the auxiliary consumer. The torque applied to the input of the auxiliary consumer is therefore the function value. To enable the function to be applied and the function value to be determined, the gearbox control unit is preferably designed to receive a rotational speed signal which is provided by the engine control unit and sent via the data transfer device.

The gearbox control unit determines the torque tapped by the auxiliary consumer. This is identical to the torque which is applied to the input of the auxiliary consumer and produced as a function value of the parameterizable function.

Based on the tapped torque, the gearbox control unit can calculate the torque applied to the input of the gearbox from the output torque provided by the engine.

The parameterizable function facilitates the installation of auxiliary consumers by a body builder. The body builder can parameterize the function according to the installed auxiliary consumers and therefore enable the gearbox control unit to determine the torque tapped by the auxiliary consumers. It is possible to define the parameters at a later point, i.e. after the vehicle having the inventive arrangement has been completed and delivered to the body builder. In this case, the auxiliary consumers to be added by the body builder are not known to the manufacturer of the vehicle.

In a preferred further development, the arrangement comprises a further control unit. This is, for instance, an engine control unit or a control unit of the auxiliary consumer. The further control unit sends information relating to the activation status of the auxiliary consumer.

The information is preferably contained in a first signal and a second signal. The control unit sends the first signal upon the activation of the auxiliary consumer. Accordingly, the control unit sends the second signal when the auxiliary consumer is deactivated.

The gearbox control unit is designed to receive the information and to determine the torque applied to the input of the gearbox using the parameterizable function when the auxiliary consumer is activated. In particular, this takes place only when the auxiliary consumer is activated. Therefore, if the auxiliary consumer is not activated, the gearbox control unit determines the torque applied to the input of the gearbox without using the function. In this case, the torque applied to the input of the gearbox corresponds to a torque provided by the engine which has not been reduced by the torque tapped by the auxiliary consumer.

Such determination of the torque applied to the input of the gearbox takes place after the gearbox control unit has received the second signal. If the auxiliary consumer is activated and the gearbox control unit has received the first signal accordingly, the gearbox control unit, using the parameterizable function depending on a current rotational speed of the engine, determines the torque tapped by the auxiliary consumer and reduces the torque provided by the engine accordingly.

A moreover preferred further development of the present disclosure likewise provides a further control unit. This can be identical to the above-mentioned further control unit, or it is a separate control unit. In particular, it can be an engine control unit. In the case of an auxiliary consumer integrated in the vehicle bus, the further development serves as a fallback level. Such an auxiliary consumer is typically not installed by the body builder, but by the vehicle manufacturer. In this case, it is possible to transmit the torque tapped by the auxiliary consumer via the vehicle bus.

According to a further development, the further control units serves for the transmission of the torque tapped by the auxiliary consumer. The torque is transmitted to the gearbox control unit periodically, i.e. in a time consecutive sequence. The transmission preferably takes place in that a signal, in which information relating to the torque is coded, is transmitted via the data processing device.

The gearbox control unit normally uses this information to determine the torque applied to the input of the gearbox. If the transmission does not occur, the gearbox control unit uses the parameterizable function as a fallback level. The function is therefore used only when the transmission of the torque tapped by the auxiliary consumer does not occur.

A method for manufacturing a motor vehicle having the arrangement described above inventively provides that the parameterizable function is parameterized. This takes place by inputting the parameters. If the inputting of the parameters is omitted, a predetermined standard function is used as the parameterizable function.

The inventive method enables a body builder to provide the gearbox control unit with information relating to the torque tapped by auxiliary consumers installed at a later point. By inputting the parameters, there is no need for complex software adaptations or interventions in the vehicle bus.

A further inventive method comprises the above-described method steps implemented by the gearbox control unit.

BRIEF DESCRIPTION OF THE DRAWINGS

A preferred exemplary embodiment of the present disclosure is illustrated in FIG. 1.

Specifically, FIG. 1 shows a drive train.

DETAILED DESCRIPTION

The drive train 101 illustrated in FIG. 1 comprises an engine 103, a gearbox 105 and an auxiliary consumer 107. The engine 103 drives both the gearbox 105 and the auxiliary consumer 107. The output power of the engine 103 is branched accordingly.

An output torque provided by the engine 103 is divided into a first torque 109a and a second torque 109b. The first torque 109a is applied to an input shaft of the gearbox 105. Accordingly, the second torque 109b is applied to an input shaft of the auxiliary consumer 107. The output torque of the engine is derived from the sum of the first torque 109a and the second torque 109b.

To determine the first torque 109a from the output torque provided by the engine 103, the second torque 109b must be known. The second torque 109b is therefore determined by means of a function which maps the rotational speed of the engine 103 and the second torque 109b to one another.

The invention claimed is:
1. A drive-train arrangement comprising:
an engine for supplying branched first and second rotational outputs;
the first rotational output and first torque forming a rotational input to a gearbox for driving wheels of a vehicle;
the second rotational output and second torque forming a separate rotational input to an auxiliary consumer, and the rotational input to the auxiliary consumer comprising a belt; and
a gearbox control unit coupled to the gearbox, and the gearbox control unit being configured so that respective rotational speeds of the engine are mapped to a respective second torque applied by the engine to the auxiliary consumer, and the gearbox control unit, during activation of the auxiliary consumer, determining the first torque being applied by the gearbox from the rotational speed of the engine and the mapped respective second torque applied by the engine to the auxiliary consumer and adapting clutch pressures of clutches of the gearbox.

2. The arrangement as claimed in claim 1, further comprising:
a further control unit;
wherein the further control unit sends information relating to the auxiliary consumer; and
the gearbox control unit is designed to receive the information and to determine the torque applied to the gearbox using a parameterizable function when the auxiliary consumer is activated.

3. The arrangement as claimed in claim 1, further comprising:
a further control unit;
wherein the further control unit is designed to determine the torque applied to the auxiliary consumer and to transmit this periodically to the gearbox control unit; and
the gearbox control unit is designed to determine the torque applied to the gearbox without using a parameterizable function when the transmission of the torque applied to the auxiliary consumer is deactivated.

4. The drive-train arrangement as claimed in claim 1, wherein the auxiliary consumer is one of a generator, a pump or a climate control compressor.

5. The drive-train arrangement as claimed in claim 1, wherein the second rotational output comprises a first rotatable component and a second rotatable component which are coupled to one another by the belt.

6. The drive-train arrangement as claimed in claim 5, wherein the first rotatable component and the second rotatable component are coupled to one another to increase a rotational speed between the first rotatable component and the second rotatable component.

7. The drive-train arrangement as claimed in claim 5, wherein the first rotatable component and the second rotatable component are coupled to one another to reduce a rotational speed between the first rotatable component and the second rotatable component.

8. The drive-train arrangement as claimed in claim 5, wherein the first rotatable component and the second rotatable component are coupled to one another so as to maintain a same rotational speed between the first rotatable component and the second rotatable component.

9. The drive-train arrangement as claimed in claim 1, wherein output torque of the engine is transmitted to the gearbox control unit by an engine control unit.

10. The drive-train arrangement as claimed in claim 1, wherein the drive-train arrangement comprises a further control unit which sends information relating to an activation status of the auxiliary consumer to the gearbox control unit.

11. The drive-train arrangement as claimed in claim 10, wherein the information comprises a first signal and a second signal, and the first signal indicates activation of the auxiliary consumer in which the gearbox control unit determines the first torque applied to the gearbox by utilizing a parameterizable function, and the second signal indicates deactivation of the auxiliary consumer in which the gearbox control unit determines the torque applied to the gearbox without utilizing the parameterizable function.

* * * * *